(12) United States Patent
McGuire et al.

(10) Patent No.: US 6,835,904 B2
(45) Date of Patent: Dec. 28, 2004

(54) BRAKE ASSEMBLY FOR AN ALL TERRAIN VEHICLE AND METHOD OF MAKING SAME

(75) Inventors: Jeremy McGuire, Columbus, OH (US); Kosuke Asao, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 20 days.

(21) Appl. No.: 10/375,677

(22) Filed: Feb. 28, 2003

(65) Prior Publication Data

US 2004/0168895 A1 Sep. 2, 2004

(51) Int. Cl.[7] .................................................. H01H 9/06
(52) U.S. Cl. ................................ 200/61.87; 200/61.85; 307/112
(58) Field of Search ........................ 200/61.85–61.88; 307/112–119

(56) References Cited

U.S. PATENT DOCUMENTS

| | | | | |
|---|---|---|---|---|
| 4,031,343 A | * | 6/1977 | Sopko | ..................... 200/61.12 |
| 4,275,280 A | * | 6/1981 | Yamazaki | ................. 200/61.85 |
| 4,297,550 A | * | 10/1981 | Leighton | ................. 200/61.89 |
| 4,395,603 A | | 7/1983 | Lauzier | |
| 4,938,057 A | * | 7/1990 | Yamazaki | .................. 73/118.1 |
| 6,521,851 B2 | * | 2/2003 | Handa et al. | ............. 200/61.87 |
| 6,619,154 B2 | * | 9/2003 | Campagnolo | ............. 74/502.2 |
| 2001/0025774 A1 | | 10/2001 | Handa et al. | |

* cited by examiner

Primary Examiner—Kyung Lee
(74) Attorney, Agent, or Firm—Sterne, Kessler, Goldstein & Fox P.L.L.C.

(57) ABSTRACT

A brake lever assembly can be assembled by providing a housing coupling the brake lever assembly to a vehicle, a brake lever pivotally attached to the housing, and a reinforcing plate mounted on the housing. The reinforcing plate can be secured to a top surface of the housing and to a side surface of the housing. The assembly can also include a parking lever pivotally mounted on the brake lever. The pivoting of the parking lever, during actuation of the brake lever, can cause a tip of the parking lever to engage the reinforcing plate. This maintains actuation of the brake lever. The assembly can further include a brake light actuation switch mounted on the reinforcing plate. The actuation of the brake lever actuates the brake light actuation switch.

12 Claims, 7 Drawing Sheets

BRAKE ASSEMBLY FOR AN ALL TERRAIN VEHICLE AND METHOD OF MAKING SAME

BACKGROUND OF THE INVENTION

1. Field of the Invention

The present invention is related to a brake lever assembly.

2. Related Art

Figure 1:
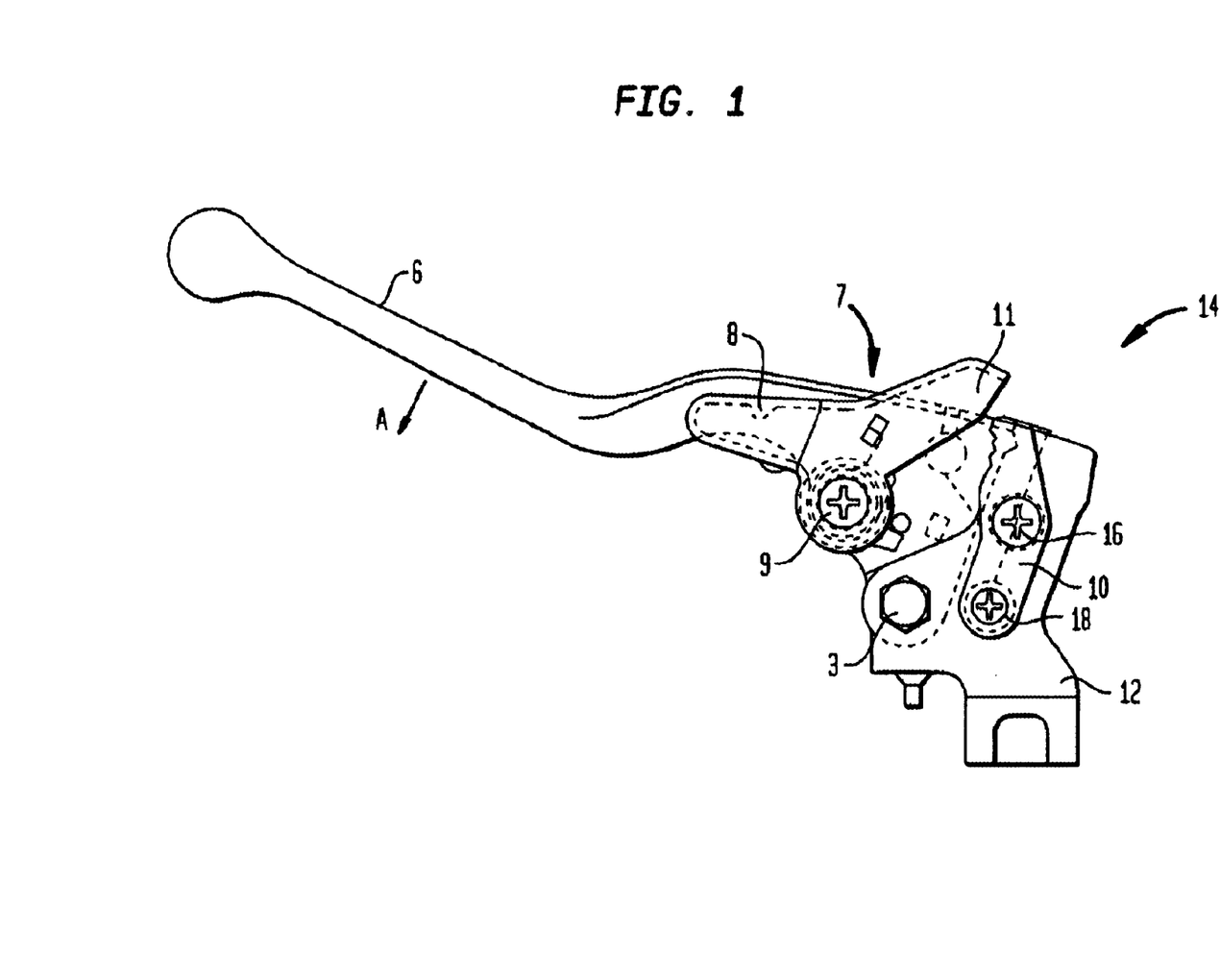
FIG. 1 is an exemplary view of a braking assembly of an automatic transmission vehicle.

Motorcycles and three-wheeled or four-wheeled saddle seat vehicles (hereinafter, all are collectively referred to simply as "vehicles") typically include a brake assembly on a steering handle for braking the vehicle. For example, many vehicles include a right-hand brake assembly for actuating front brakes of the vehicle and a left-hand brake assembly for actuating rear brakes of the vehicle. Examples of left-hand or rear brake assemblies 14 are shown in FIG. 1 (e.g., an automatic transmission vehicle) and FIG. 2 (e.g. a manual transmission vehicle).

Figure 2:
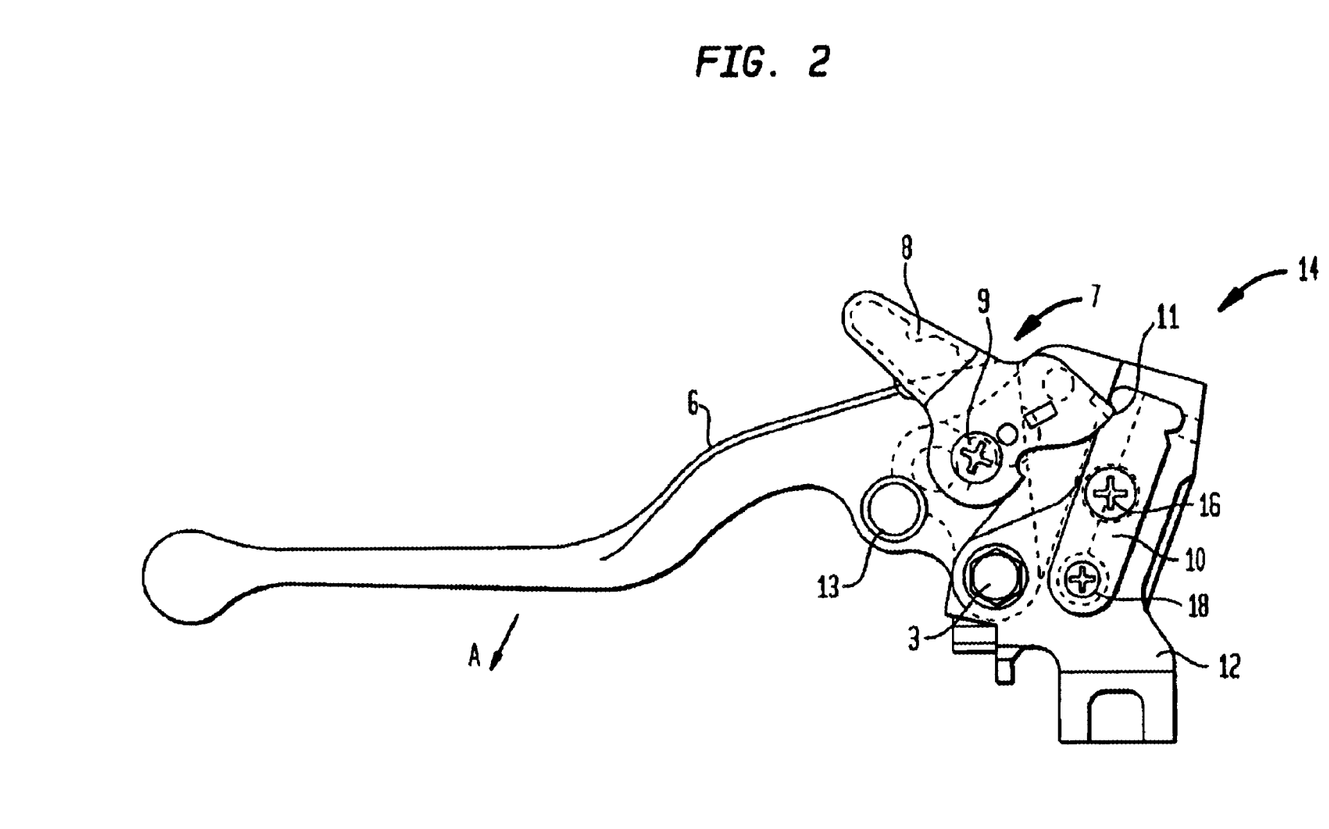
FIG. 2 is an exemplary view of a braking assembly of a manual transmission vehicle.

A rear brake assembly 14 often includes a locking mechanism 7 that allows the rear brake assembly to be used as a parking brake. For example, as shown in FIGS. 1 and 2, the rear brake assemblies include a brake lever 6 that is pivotally mounted to a housing 12 using a bolt or pivot pin 3. A user pulling lever 6 in direction A toward a handgrip (not shown) actuates rear brakes. When the user releases lever 6, a spring (not shown) causes lever 6 to return to its rest position. Locking mechanism 7 can be used to maintain lever 6 in the actuated position so that the rear brake remains actuated even upon release of lever 6.

Locking mechanism 7 includes a lever 8 that pivots about a bolt 9. To activate the parking brake, lever 6 is first pulled in direction A to actuate the brakes. Then, lever 8 is pivoted in a clockwise direction about bolt 9 so that a tip 11 of lever 8 engages with housing 12 to hold lever 6 in its depressed or actuated position.

Manufacturer sometimes mount a reinforcement plate 10 to housing 12 using screws 16 and 18. This reinforcement plate 10 provides an engagement point for tip 11 of lever 8 and thereby protects housing 12 from the wear and tear of frequent parking brake use.

Manufacturers also sometimes include on brake assembly 14; a brake light switch (not shown) that senses actuation of brake lever 6 and activates a brake light system. On automatic transmission vehicles, the switch is typically mounted to the underside of housing 12.

On manual transmission vehicles, a reverse engage switch 13 (see FIG. 2) is positioned on assembly 14. Reverse engage switch 13 extends through lever 6 and controls a cable (not shown) beneath assembly 14. The cable extends from assembly 14 to the vehicle transmission and is used to engage a reverse gear. The location of reverse engage switch 13 and the cable attached thereto makes is difficult to mount a brake light switch beneath assembly 14.

An alternative mounting position for the brake light switch is on the top surface of housing 12. However, such positioning interferes with reinforcing place 10.

Therefore, what is needed is a brake assembly for a manual transmission vehicle that allows for attachment of both a reinforcement plate and a brake light switch.

BRIEF SUMMARY OF THE INVENTION

An embodiment of the present invention provides a system including a housing that couples a brake lever assembly to a vehicle, the brake lever assembly including a brake lever pivotally attached to the housing and a reinforcing plate mounted on the housing. The reinforcing plate can be secured to a top surface of the housing and to a side surface of the housing. The assembly can also include a parking lever pivotally mounted on the brake lever. The pivoting of the parking lever, during actuation of the brake lever, can cause a tip of the parking lever to engage the reinforcing plate. This maintains actuation of the brake lever. The assembly can further include a brake light actuation switch mounted on the reinforcing plate. The actuation of the brake lever actuates the brake light actuation switch.

Another embodiment of the present invention provides a method of assembling a brake lever assembly including pivotally coupling a brake lever to a housing, coupling a reinforcement plate to a top surface and a side surface of the housing, and pivotally coupling a parking lever to the brake lever. The pivoting of the parking lever, during actuation of the brake lever, causes a tip of the parking lever to engage the reinforcing plate and to thereby maintain actuation of the brake lever. The method also includes coupling a brake light actuation switch to the reinforcement plate. The actuation of the brake lever actuates the brake light actuation switch.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, some like reference numbers indicate identical or functionally similar elements.

DETAILED DESCRIPTION OF THE INVENTION

Figure 3:
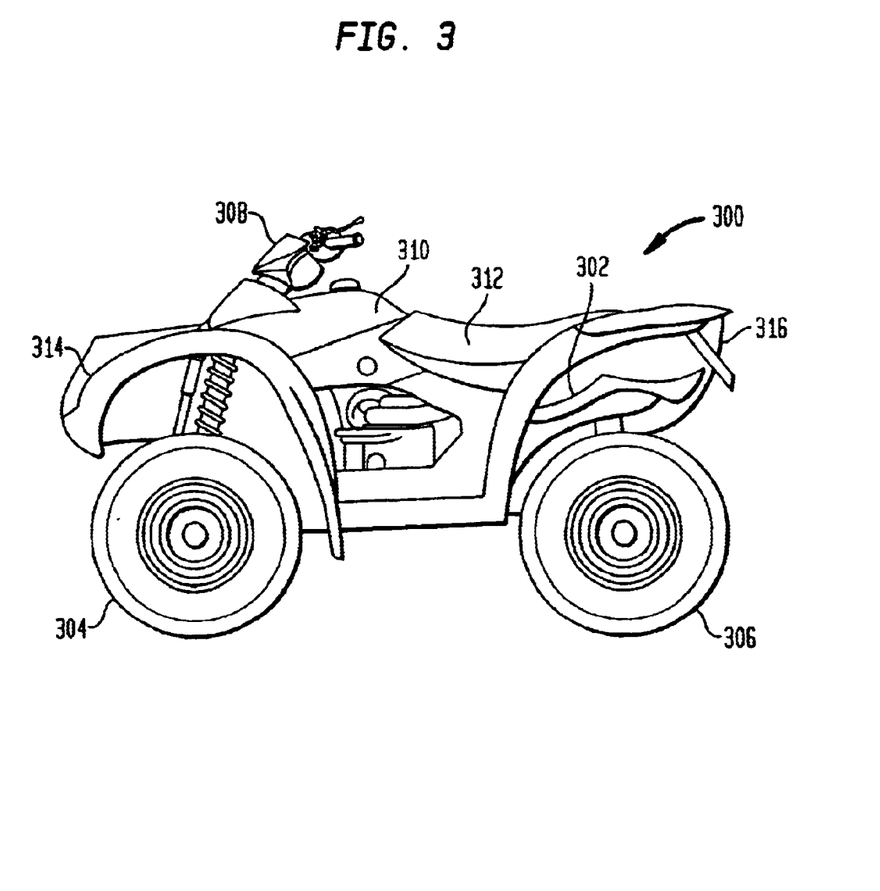
FIG. 3 is side view of a vehicle according to an embodiment of the present invention.

FIG. 3 is a side view of a vehicle (e.g., an all terrain vehicle) 300 according to an embodiment of the present invention. A four-wheel vehicle is shown and described merely as an example of one type of all terrain vehicle. Other all terrain vehicles (e.g., motorcycles, three-wheel vehicles, or the like) are also contemplated within the scope of the present invention.

Vehicle 300 includes a vehicle body frame 302 with wheels 304 disposed on opposite sides of a front portion of frame 302 and rear wheels 306 disposed on opposite sides of a rear portion of frame 302. A steering handle (or handlebars) 308 is disposed on the upper side of a front portion of frame 302 for steering front wheels 304. A saddle-style seat 312 is provided for a vehicle operator and, optionally, a passenger. A fuel tank 310 is mounted on frame 302 between seat 312 and steering handle 308. A front fender 314 is disposed to cover the upper side of wheels 304, and a rear fender 316 is disposed to cover the upper side of wheels 306.

Figure 4:
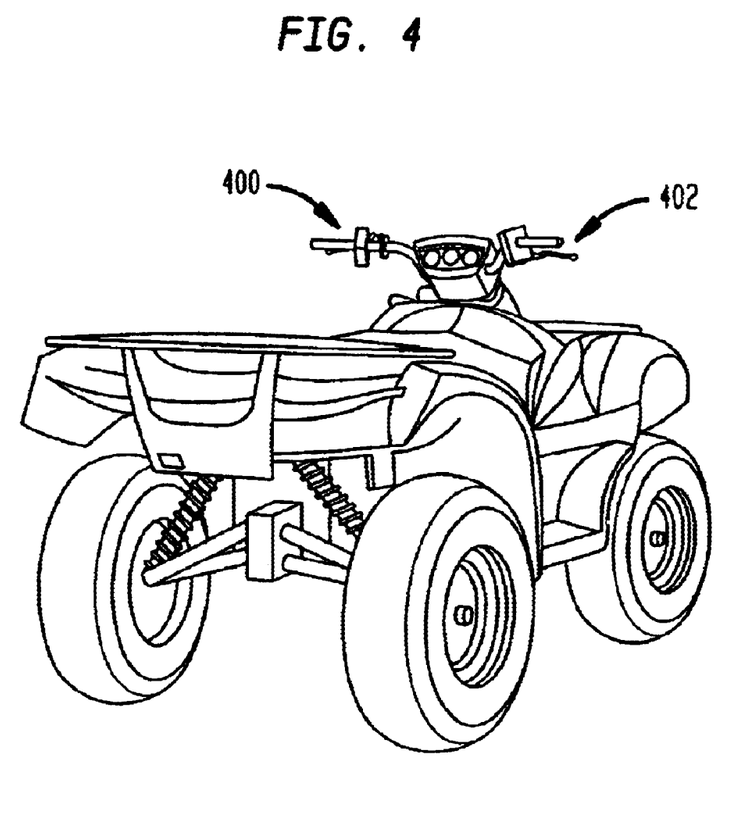
FIG. 4 is a partial top view of the vehicle in FIG. 3 illustrating the steering mechanism with attached left-hand and right-hand braking assemblies.

FIG. 4 shows brake assemblies 400 and 402 mounted on steering handle 308. Left-hand brake assembly 400 controls the rear brakes of the vehicle. Right-hand brake assembly 402 controls the front brakes of the vehicle. The present invention is described as being applied to the left-hand or rear brake assembly 400. A person skilled in the art will recognize, however, that on some vehicles the invention could be applied to a right-hand brake assembly. A person skilled in the art will also recognize that on some vehicles the left-hand brake assembly could be used to control the front brakes and the right-hand brake assembly could be used to control the rear brakes. Alternatively, either the right-hand or left-hand brake assembly could be used to control both front and rear brakes using, for example, the Honda Linked Braking System (LBS) available from American Honda Motor Company, Inc.

Figure 5:
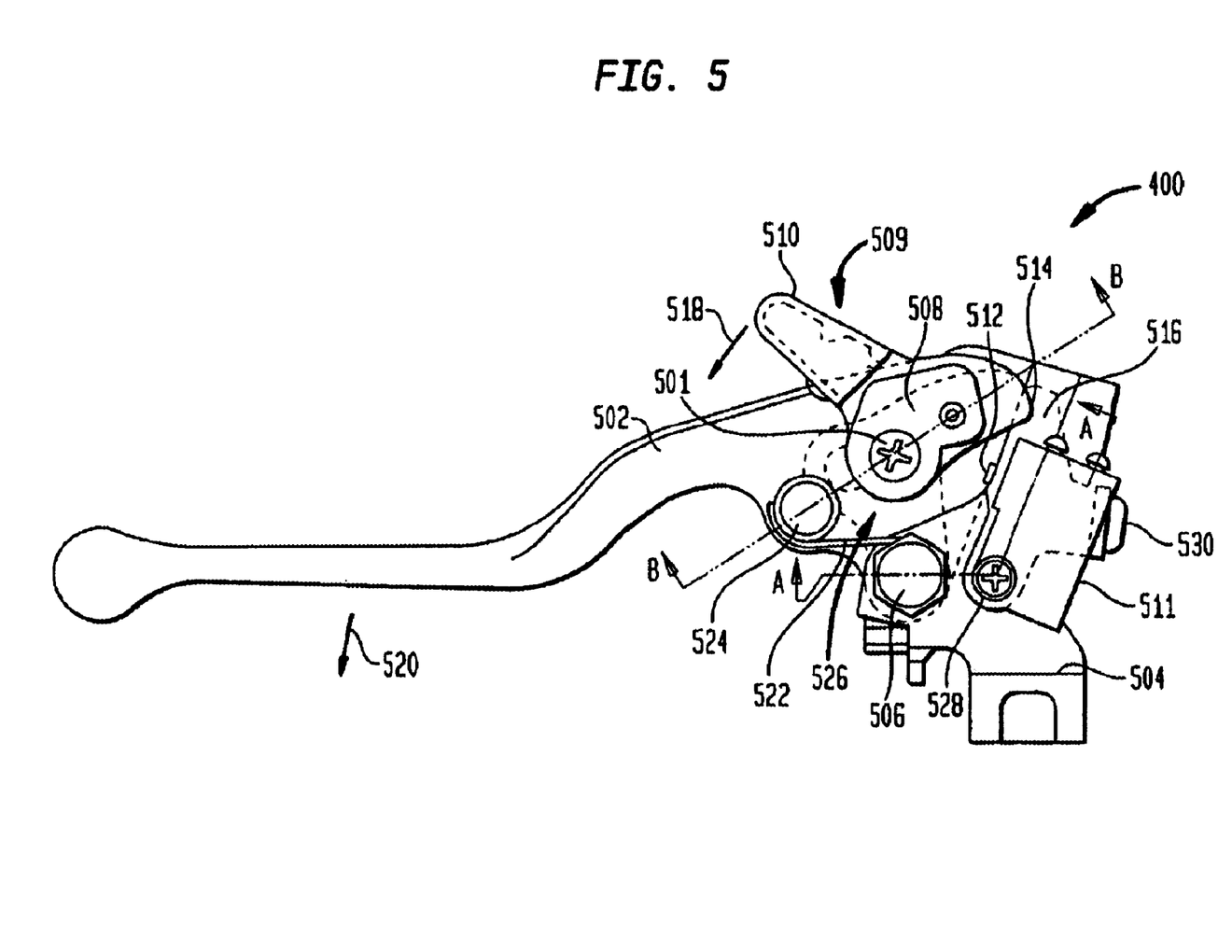
FIG. 5 shows a brake assembly according to an embodiment of the present invention.

FIG. 5 shows brake assembly 400 according to an embodiment of the present invention. In one embodiment, brake assembly 400 is used on a manual transmission vehicle. Brake assembly 400 includes a brake lever 502 pivotally coupled to a housing (i.e., a support or bracket) 504 via bolt or pin 506. Brake lever 502 can be biased by spring 522 that is coupled to bolt 506 and a reverse engage switch 524. Assembly 400 further includes a parking brake assembly 509 and a brake light switch 511. Brake light switch 511 includes a contact plunger 512 for switch activation.

Parking brake assembly 509 includes a parking lever 508 and a reinforcing plate 516. An optional gripping device 510 may be mounted on lever 508 and can include a sleeve, tube, or coating on lever 508 that facilitates gripping by an operator and makes for a more comfortable gripping experience. Parking lever 508 is pivotally mounted to lever 502 via a bolt or pin 501. Parking lever 508 includes a tip 514 configured to engage a mating surface of reinforcing plate 516. As depicted in FIG. 5, lever 502 is in an actuated position. That is, lever 502 has been pulled in a direction of arrow 520 to engage the brakes. Lever 508 is also shown in an actuated position. That is, parking lever 508 has been rotated in a clockwise direction so that tip 514 has engaged reinforcing plate 516 to maintain actuation of the vehicle brakes.

In the position shown in FIG. 5, plunger 512 of switch 511 is out of contact with surface 526 of lever 508. This causes the plunger to extend outward from switch 511 by action of an internal spring (not shown) to either make or break a contact connection (depending on the type of switch being used) and thereby light the brake light (not shown).

Reinforcing plate 516, which is partially shown in phantom, is secured to housing 504 via a bolt or screw 528, which is also used to secure switch 511. Another bolt or screw 530 secures reinforcing plate 516 to a side surface of housing 504. Securing reinforcing plate 516 to the side surface of housing 504 in the manner shown provides a strong mechanical attachment without interfering with the mounting of switch 511 thereon. As shown, switch 511 is mounted to housing 504 with reinforcing plate 516 being disposed therebetween.

Figure 6:
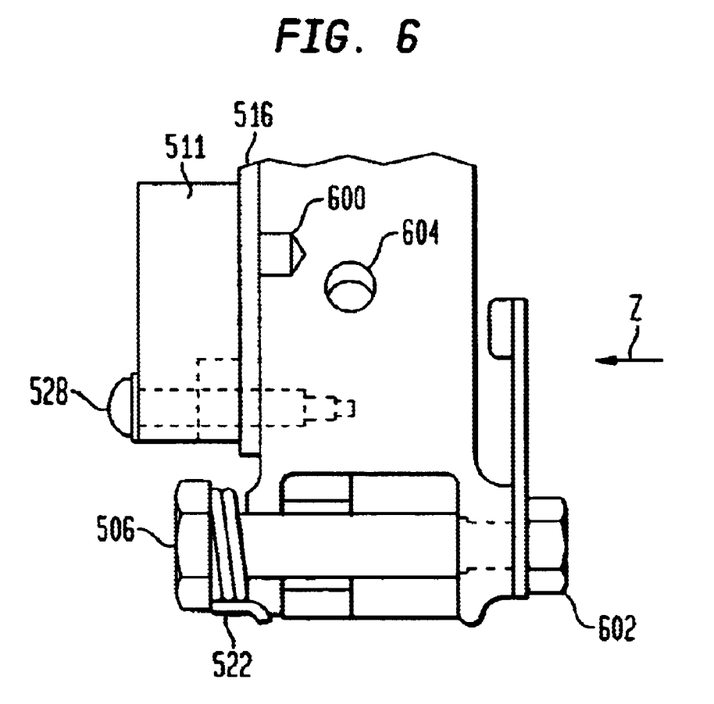
FIG. 6 is a cross-sectional view of the brake assembly of FIG. 5 along lines A—A.

FIG. 6 is a cross-section view of brake assembly 400 along line A—A in FIG. 5 according to an embodiment of the present invention. Switch 511 can be coupled to the housing 504 via a post 600. Bolt 506 is secured to housing 504 using a nut 602, or the like. An opening 604 (e.g., a tapped/threaded bore) in housing 504 can receive bolt 530 (not shown in FIG. 6).

Figure 7:
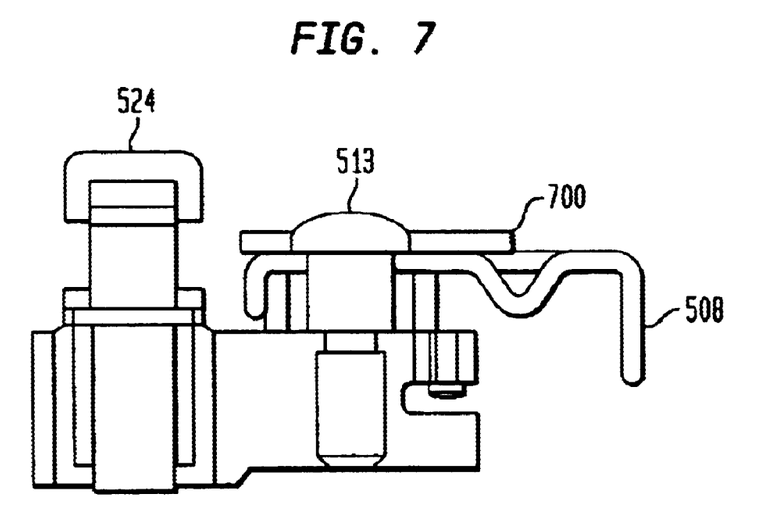
FIG. 7 is a cross-sectional view of the brake assembly of FIG. 5 along line B—B.

FIG. 7 is a cross-sectional view of brake assembly 400 along line B—B in FIG. 5 according to an embodiment of the present invention. Parking lever 508 can include a plunger strike plate 700 fixedly attached to the top surface of lever 508. Plate 700 is positioned to interact with plunger 512 to actuate switch 511 upon movement of lever 520. In an embodiment, plate 700 can have a tear drop shape.

Figure 8:
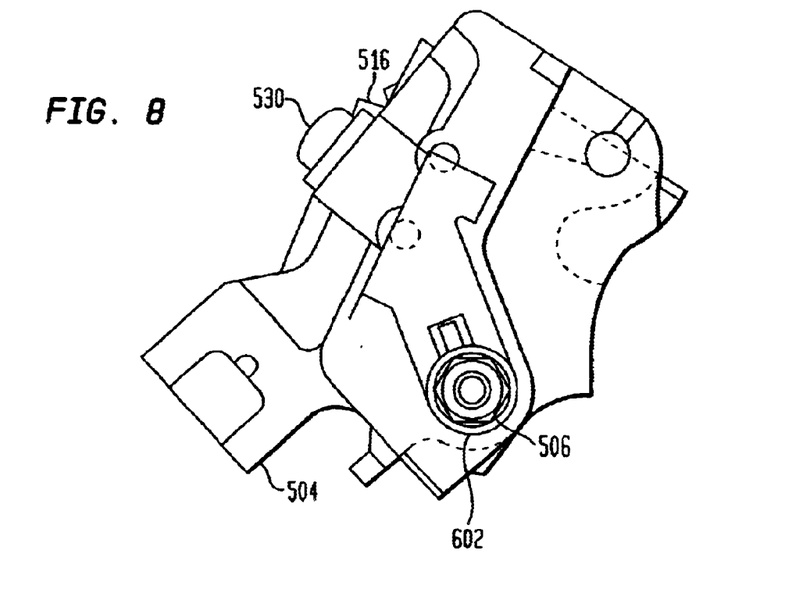
FIG. 8 is a partial view of the brake assembly of FIG. 5 looking from perspective Z in FIG. 6.

FIG. 8 is a view of brake assembly 400 looking from perspective Z in FIG. 6 according to an embodiment of the present invention. This can be considered a bottom view of brake assembly 400. Nut 602 and a bottom end of bolt 506 are shown. In the configuration of this embodiment, a longitudinal axis of bolt 530 can be approximately 90 degrees with respect to a longitudinal axis of bolt 506.

Figure 9:
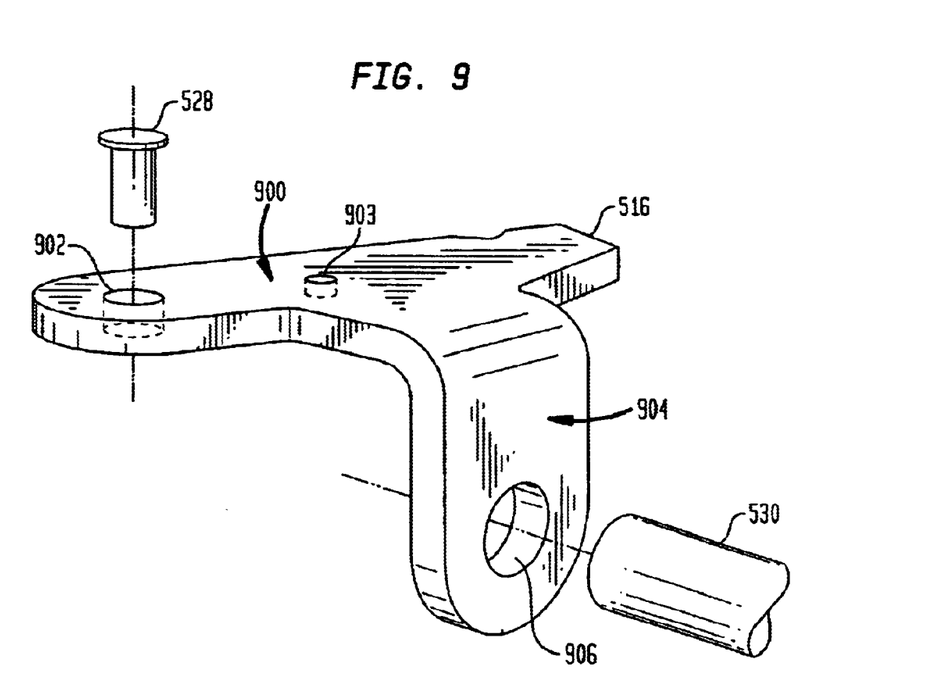
FIG. 9 shows a reinforcement plate according to an embodiment of the present invention.

FIG. 9 is a perspective view of reinforcement plate 516 according to an embodiment of the present invention. A first section 900 includes an opening 902 that receives bolt 528. A second section 904 includes an opening 906 that receives bolt 530. An opening 903 is positioned to receive post 600 of switch 511, so as to prevent lateral movement of switch 511 relative to plate 516. In an embodiment, a plane including first section 900 can be at an angle with respect to a plane including second section 904. For example, the angle can be approximately 90 degrees.

In this configuration, brake assembly 400 can include both brake switch 511 and reinforcement plate 516 attached to a top surface of housing 504 using a single bolt 528. Also, plate 700 can be used to compensate for a positional upward shift of plunger 512, which is caused by placement of switch 511 and reinforcement place 516 on the top surface.

In an embodiment, most of the parts of brake assembly 400 can be made from aluminum, magnesium, steel, and alloys, and mixtures thereof, as is known in the art. It is to appreciated, other materials can also be used without departing from the scope of the invention. In an embodiment, grip 510 can be made from a rubber material.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system including a housing that couples a brake lever assembly to a vehicle, the brake lever assembly comprising:

a brake lever pivotally attached to the housing;

a reinforcing plate mounted on the housing, the reinforcing plate being secured to a top surface of the housing and to a side surface of the housing;

a parking lever pivotally mounted on the brake lever, such that pivoting of the parking lever, during actuation of the brake lever, causes a tip of the parking lever to engage the reinforcing plate and to thereby maintain actuation of the brake lever; and a brake light actuation switch mounted on the reinforcing plate so that actuation of the brake lever actuates the brake light actuation switch.

2. The brake lever assembly of claim 1, wherein the reinforcing plate has an approximately right angle bend therein, the bend providing a first surface configured for engagement with the top surface of the housing and a second surface configured for engagement with the side surface of the housing.

3. The brake lever assembly of claim 1, wherein the parking lever comprises a plate that is configured to interact with the brake light actuation switch.

4. The brake lever assembly of claim 1, wherein at least one of the housing, the brake lever, and the reinforcement plate are made from aluminum.

5. The brake lever assembly of claim 1, wherein the housing is a bracket.

6. A method of assembling a brake lever assembly, the method comprising:

pivotally coupling a brake lever to a housing;

coupling a reinforcement plate to a top surface and a side surface of the housing;

pivotally coupling a parking lever to the brake lever, such that pivoting of the parking lever, during actuation of the brake lever, causes a tip of the parking lever to engage the reinforcing plate and to thereby maintain actuation of the brake lever; and coupling a brake light actuation switch to the reinforcement plate, such that the actuation of the brake lever actuates the brake light actuation switch.

7. The method of claim 6, further comprising coupling a plate to the parking lever, such that the plate interacts with the brake lever actuation switch.

8. The method of claim 6, further comprising turning a parking brake light OFF during the interaction.

9. The method of claim 6, further comprising coupling the brake lever assembly to a vehicle.

10. The method of claim 9, comprising providing a manual transmission vehicle as the vehicle.

11. The method of claim 6, comprising providing an all terrain vehicle as the vehicle.

12. The method of claim 6, wherein the reinforcement plate coupling step comprises:

providing a substantially planar plate having an approximately right angle bend thereto as the reinforcement plate, the bend providing a first surface and a second surface;

coupling the first surface to the top surface of the housing; and coupling the second surface to the side surface of the housing.

* * * * *